United States Patent [19]

Kuepper

[11] 4,156,648
[45] May 29, 1979

[54] FLOTATION DEVICE WITH PRETREATMENT

[75] Inventor: Theodore A. Kuepper, Oxnard, Calif.

[73] Assignee: The United States of America as represented by the Secretary of the Navy, Washington, D.C.

[21] Appl. No.: 910,328

[22] Filed: May 30, 1978

[51] Int. Cl.² .......................... B01D 17/00; B03D 1/00
[52] U.S. Cl. ................................... 210/44; 210/73 R;
    210/199; 210/202; 210/203; 210/221 P;
    209/164; 209/170
[58] Field of Search ............... 210/13, 44, 73 R, 73 S,
    210/199, 202, 203, 209, 219, 221 P, 259, 295,
    297, 319, 320, 521; 209/162, 163, 164, 166, 170

[56] References Cited

U.S. PATENT DOCUMENTS

| | | | |
|---|---|---|---|
| 1,250,303 | 12/1917 | Greenawalt | 210/221 P |
| 1,407,258 | 2/1922 | Connor | 210/221 P |
| 2,757,797 | 8/1956 | Eckert | 210/44 |
| 2,793,185 | 5/1957 | Albrektsson | 210/44 |
| 2,920,763 | 1/1960 | Lind | 210/44 |
| 2,994,432 | 8/1961 | Schluter | 210/44 |
| 3,313,795 | 4/1967 | Rubin | 210/44 |
| 3,397,140 | 8/1968 | Dea | 210/44 |
| 3,932,282 | 1/1976 | Ettelt | 210/221 P |
| 3,977,970 | 8/1976 | Willis | 210/73 S |
| 4,053,399 | 10/1977 | Donnelly | 210/73 S |

FOREIGN PATENT DOCUMENTS 654003 12/1962 Canada .................................. 210/221 P Primary Examiner—Charles N. Hart
Assistant Examiner—Ernest G. Therkorn
Attorney, Agent, or Firm—Richard S. Sciascia; Joseph M. St.Amand; Andrew S. Viger

[57] ABSTRACT

Methods and apparatus for treating water/wastewater to remove grit, suspended and colloidal solids of organic and inorganic nature, microorganisms and surfactants. Dense suspended solids (grit) are first removed by a centrifugation process. The influent water/wastewater is then passed through coagulation and flocculation chambers, an upflow clarifier and a high-rate settling chamber for final sedimentation. Next, the influent passes through a foam filter to remove colloidal particles. The water/wastewater under treatment is then pressurized and saturated with air and subsequently depressurized, causing the dissolved gas to bubble out of solution floating out suspended contaminants. At this point, ozone is introduced into the influent to create a thicker, more dense foam by oxidizing organic matter and for disinfection purposes. The foam floated to the surface of the influent is scraped off and furnishes the foam for the foam filter.

20 Claims, 3 Drawing Figures

FLOTATION DEVICE WITH PRETREATMENT

BACKGROUND

The present invention relates to methods and apparatus for treating water/wastewater, and in particular to such methods and apparatus for treating water/wastewater with a variety of contaminant characteristics such as grit, suspended and colloidal solids of organic and inorganic nature, microorganisms and surfactants.

Current water/wastewater treatment systems used to pretreat influent before advanced water treatment stages (such as demineralization and disinfection) vary substantially depending upon the expected water/wastewater influent characteristics. In many applications, these characteristics may not be even known or readily determined. The current water/wastewater pretreatment stages include primary settling, chemical coagulation, filtration and chlorine addition. Each of these methods is designed to operate on a specific type of water contaminant characteristic and, if used properly, produces water of predictable quality. There is no universal water treatment system today capable of reliably removing a wide range of water borne contaminants including grit. Suspended and colloidal solids of organic and inorganic nature, microorganisms and surfactants. Even with a combination of the above named pretreatment units, the water stream would still contain surfactants, micromolecular colloidal solids and oxidizing agents (chlorine) which may be undesirable in the advanced stages of water treatment, particularly demineralization. In addition, the above named and currently available water/wastewater pretreatment stages require constant supervision due to chemical additions and filter back-washing modes, and require substantial manpower for installation and equipment maintenance.

It is therefore an object of the present invention to provide methods and apparatus for treating water/wastewater to remove grit, suspended and colloidal solids of organic and inorganic nature, microorganisms and surfactants.

A further object of the present invention is to provide such methods and apparatus without requiring the use of conventional filters.

Another object of the present invention is to provide such methods and apparatus requiring a minimum of moving parts and chemical additives to reduce maintenance and supply requirements.

Still another object of the present invention is to provide such methods and apparatus capable of operating equally satisfactorily on a raw water source such as brakish surface or ground water, or on gray waste water from laundry, shower and galley sources.

Accordingly, to accomplish these and other objects, the present invention provides methods and apparatus for pretreating water/wastewater in preparation for an advanced treatment stage such as demineralization or disinfection. This pretreatment process is designed to remove a variety of contaminants including grit, suspended and colloidal solids of organic and inorganic nature, microorganisms and surfactants.

Influent water/wastewater is first subjected to a centrifugation process to remove grit and other dense suspended solids. The influent is then collected in a coagulation tank and vigorously stirred to facilitate coagulation. If sufficient coagulating agents or surfactants are not present, chemical coagulants are added. Next the influent is passed through a flocculation tank comprised of a number of vertical baffled and unbaffled chambers which facilitate flocculation and upflow clarification (settling). After coagulation and flocculation, the influent water/wastewater is passed through a high-rate, lamella (parallel plate) separator for final sedimentation.

At this point, the influent water/wastewater is passed through a foam filter to remove colloidal solids. The influent if then collected in a pressurized air saturation tank where air is injected into the water and the air/water solution is pressurized to cause the complete dissolution of the air within the influent. The air saturated influent is then depressurized; the air bubbling out of the solution produces a thick foam which floats contaminants to the surface of the influent. In addition, ozone is introduced and bubbled through the influent to create a thicker, more dense foam by oxidizing organic matter. Lastly, additional ozone is introduced for disinfection purposes. The foam which collects on the surface of the influent is scraped off by conventional means and deposited at the foam filter, replenishing the foam supply in the foam filter.

The novel features believed to be characteristic of the above summarized invention are set forth in particularity in the appended claims. However, a more complete appreciation of the present invention, both as to organization and mode of operation and many of the attendant advantages thereof will result as the same becomes better understood by reference to the following detailed description when considered in conjunction with the accompanying drawings.

DESCRIPTION OF THE PREFERRED EMBODIMENT

Figure 2:
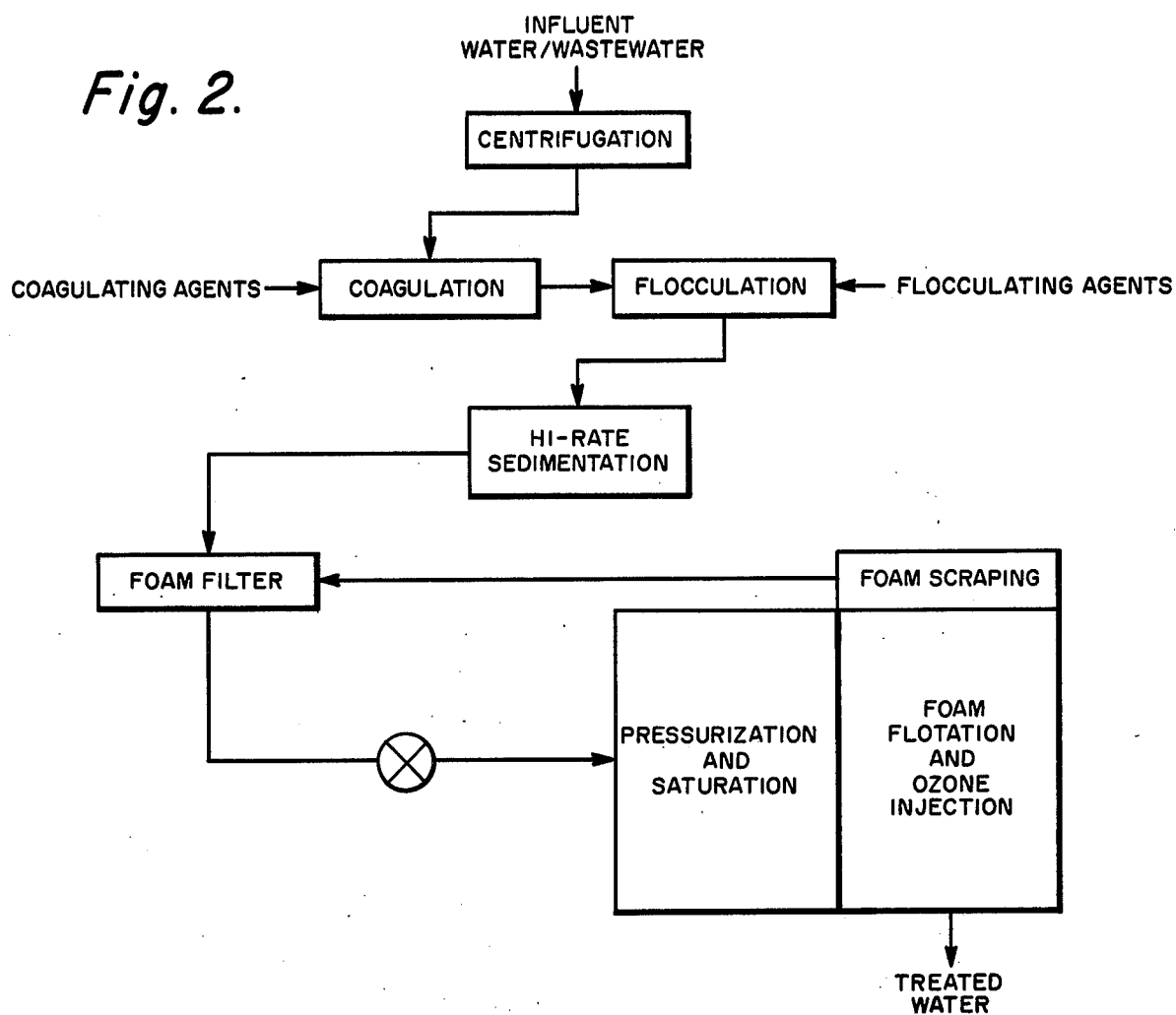
FIG. 2 is a combination block-flow diagram for one method of treating water/wastewater according to the present invention.

Referring now to the drawings wherein like reference characters designate like or corresponding elements throughout the several views, FIG. 2 indicates the various stages of the water/wastewater pretreatment system according to the present invention. Influent water/wastewater is first subjected to a centrifugation process to remove dense suspended solids. This is proceeded by the coagulation and subsequent flocculation of suspended and colloidal solids. Coagulating and/or flocculating agents can be added to facilitate these processes. The resulting suspended flocculants are then settled out of the solution in an upflow clarifier followed by a high-rate sedimentation process. The influent subsequently passes through a foam filter and into a Dissolved Air Flotation (DAF)/Ozone treatment chamber. The influent is pressurized and saturated with air and then depressurized; the dissolved air then bubbles out of solution, producing a foaming action which floats suspended contaminants out of the influent. Finally, ozone is bubbled through the influent to produce more foaming action and for disinfection purposes. The foam is scraped off the surface of the influent and is used to replenish the foam in the foam filter.

Figure 1:
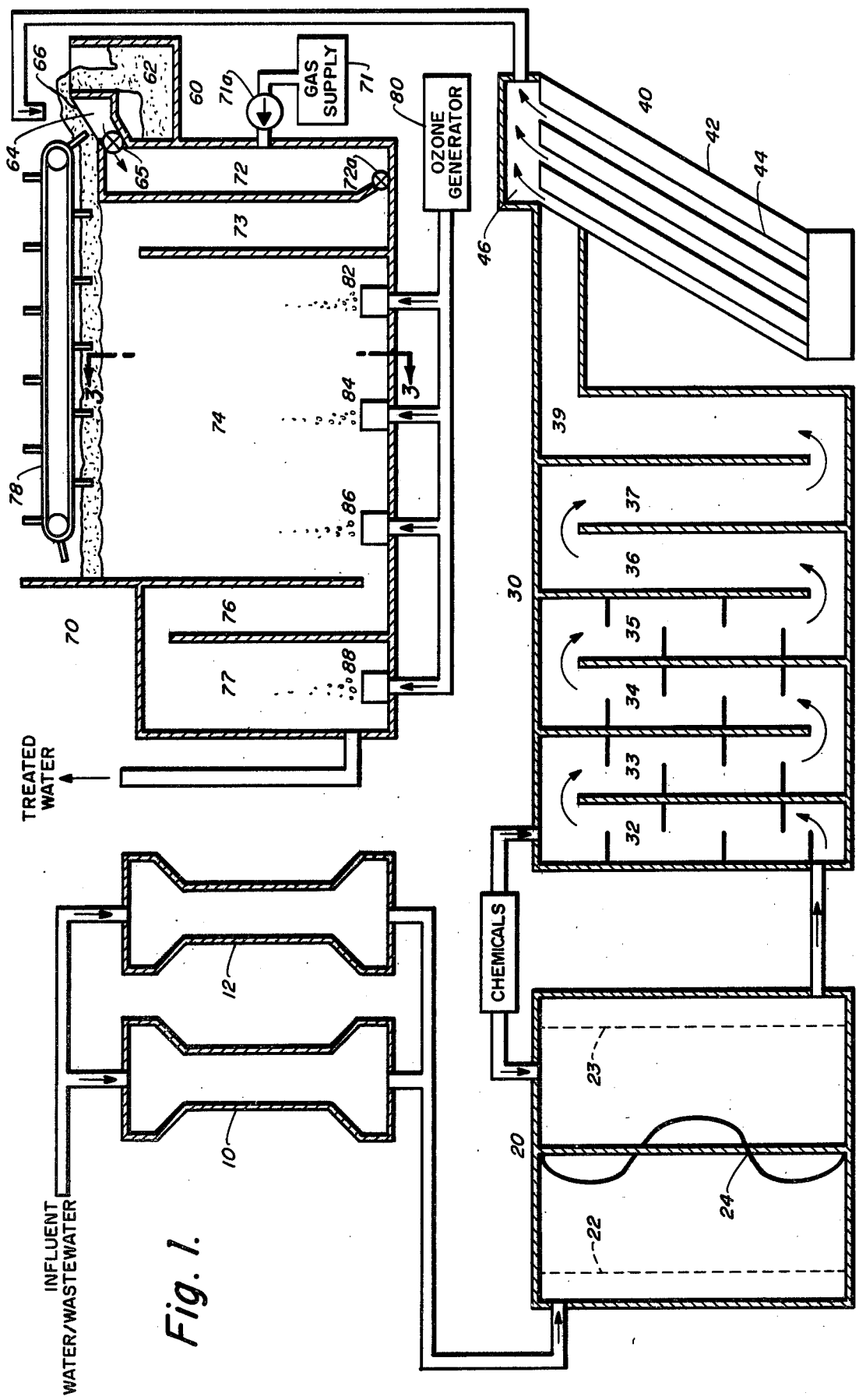
FIG. 1 is a schematic sectional representation of a preferred embodiment of the water/wastewater treatment apparatus according to the present invention.

The water/wastewater treatment system according to the present invention can be readily accommodated to particular volumetric requirements. By way of illustration, the following discussion of a preferred embodiment is with respect to a pretreatment system capable of treating water/wastewater influent at a rate of 25,000 gallons per day (94,625 liters/day). Now referring to the schematic sectional diagram in FIG. 1, influent water/wastewater is introduced into centrifugal separators 10 and 12. The centrifugal separators centrifugally remove suspended solids with specific weights substantially different than the influent liquid. Removals of over 90 percent for suspended solids with a 1.8 specific weight and a size of 44 microns can be obtained via centrifugal separation. After centrifugation, the influent exits centrifugal separators 10 and 12 and is collected in a coagulation chamber 20. Coagulation chamber 20 includes a rotor 24 disposed in the center of the chamber producing sufficient rpm to thoroughly mix the water/wastewater influent. Baffles, indicated generally at 22 and 23, are located within coagulation chamber 20 to aid in the mixing process and to prevent short circuiting (insufficient retention time) within the coagulation chamber, thus insuring adequate agglomeration. If sufficient coagulating agents to produce efficient coagulation are not present in the influent water/wastewater, coagulating chemicals (alum, sodium sulfonate, synthetic polymers, etc.) can be added to aid in coagulation (and subsequent flocculation) of suspended colloidal particles. However, if the pretreatment system is operated on primarily gray waste water (laundry, shower, galley), or any waste stream with similar foaming characteristics, sufficient soaps and detergents will already be in the waste stream to allow operation without chemical additives. A resident time within coagulation chamber 20 of approximately 10 minutes is usually sufficient to assure adequate agglomeration. Therefore, a 170 gallon (643 liter) tank would be sufficient for the illustrative flow rate of 25,000 gallons per day (94,625 liters/day) called for in the present discussion of the preferred embodiment. The influent water/wastewater exits coagulation chamber 20 to pass through a flocculation chamber 30.

Flocculation chamber 30 comprises four vertical-flow baffle chambers 32, 33, 34 and 35, two vertical-flow unbaffled chambers 36 and 37 and an exit passageway 39. The four baffled sections 32, 33, 34 and 35 facilitate gentle mixing to enhance the flocculation process (a typical retention time of 20 minutes would permit sufficient agglomeration). Throughout the upward flow section of flocculation chamber 30, the movement of water/wastewater and agglomerated and suspended solids must travel through the settling sediment at the bottom of the chamber, creating the excellent settling characteristics of an upflow clarifier (settler). This primary sedimentation process occurs especially within sections 36, 37 and 39. After flocculation and the settling effects of upflow clarification, the influent water/wastewater enters a high-rate, lamella (tube-type) settling device 40.

Lamella separator 40 is comprised of a series of parallel inclined tube sections each comprising a settling plate (indicated at 44). The influent stream enters the lamella separator via passageway 39. As the influent passes downward through the lamella plates, settling takes place. Both the liquid and the solids travel in the same direction, the liquid actually aiding the movement of sediment down the plate. As the bottom of lamella separator 40, the clarified influent is separated from the sediment and returned to the top of the separator via return tubes 44. The influent water/wastewater leaves lamella separator 40 and flows via gravity to a Dissolved Air Flotation (DAF)/Ozone treatment chamber.

The water/wastewater influent enters the DAF/Ozone treatment chamber after passing through a foam filter 60. In a manner described below, foam is deposited on a perforated plate 66. The influent is passed through the foam and the perforated plate into a passageway 64. Excess foam is collected in a tank 62. Such a filter system accomplishes a number of functions. Colloidal solids are retained within the foam and are swept into foam retention container 62 for subsequent removal. In addition, an enrichment of the influent also occurs as this filtration proceeds. Surfactant material reenters the water/wastewater influent if the influent is lacking in sufficient foaming agent. After foam filtration, the influent passes via passageway 64 through a valve 65 into DAF/Ozone treatment chamber 70.

DAF/Ozone treatment chamber 70 comprises a pressurized air saturation tank 72, a depressurization inlet chamber 73, a main flotation chamber 74, and ozone disinfection treatment chambers 76 and 77. Influent water/wastewater is collected in air saturation tank 72. Here, air from a gas supply 71 is injected into saturation tank 72 through a valve 71a; the air water solution is then pressurized (typically between 40-85 psig (2.8-6.0 kgs/cm$^2$)). A retention time of approximately 5 minutes is usually sufficient to allow complete dissolution of the injected air. Therefore, for the illustrative 25,000 gallon per day (94,625 liters/day) flow rate, a tank capacity of 85 gallons (322 liters) would be sufficient. After saturation, the influent flows via a valve 72a through inlet chamber 73 and enters main flotation tank 74. As the influent mixture is depressurized in inlet chamber 73, the dissolved air comes out of solution, forming microscopic bubbles which attach themselves to suspended and colloidal contaminants.

Figure 3:
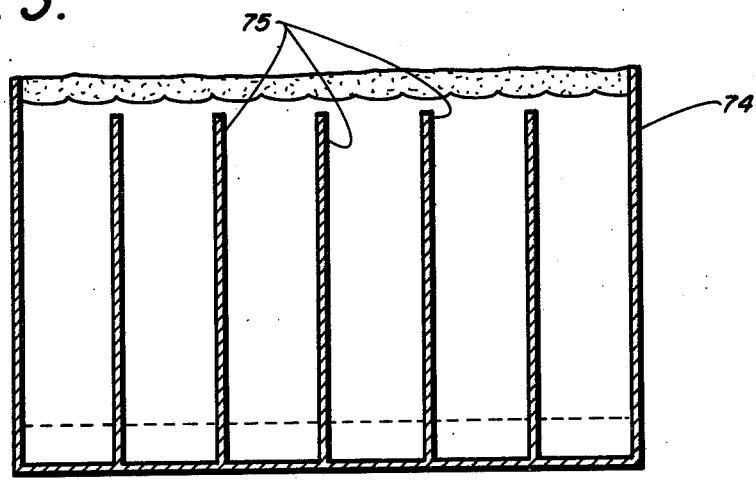
FIG. 3 is a schematic cross-sectional diagram of the flotation tank showing a series of vertical plates.

Referring to the cross section of main flotation tank 74 in FIG. 3, a series of vertical plates (lamels) 75 are mounted longitudinally to the direction of influent flow. As is well known in the art, the velocity of water is greatest in the middle of each channel formed by lamels 75. Particles carried in the water through the laminar section have the tendency to migrate toward the lamel wall and, with added air, float to the surface close to the walls. Thus, the air bubbles released from solution by depressurization, along with attached suspended and colloidal contaminants, rise to the surface of main flotation tank 74. The lamel plates 75 allow a far greater flow rate without producing disturbing turbulence, therefore reducing the surface area required for main flotation tank 74. (For the 25,000 gallon per day (94,625 liters/day) flow rate, a surface area less than 40 square feet (3.7 m$^2$) would be sufficient.)

Ozone is introduced at three points, 82, 84 and 86, in main flotation tank 74. The ozone is provided by an ozone generator 80. The function of the ozone is to create a thicker, more dense foam by oxidizing organic matter, such as proteinaceous colloidal solids, and inorganic solids. This serves to increase the flotation of colloidal and suspended solids out of the influent solution. The oxidation process is caused primarily by the first two ozone distributors 82 and 84. The foam which collects on the surface of the influent in main flotation tank 74 is scraped by means of a conventional ferris-wheel scraper 78 and deposited on perforated plate 66 in position for the foam filtration process to occur.

Scraper 78 continually sweeps foam across perforated plate 66 and into foam retention tank 62.

After traversing the laminar sections in main flotation tank 74, the influent passes through disinfection chambers 76 and 77. Ozone distributor 86 in main flotation tank 74 together with an ozone distributor 88 in disinfection chamber 77 promote ozone disinfection of the influent. The quality of the water as it exits disinfection chamber 77 is sufficient to allow disinfection to occur without an excessive quantity of ozone being produced. At this point, the water/wastewater influent has been removed of grit, suspended and colloidal solids of organic and inorganic nature, microorganisms and surfactants. The influent is now suitable for subsequent advanced treatment stages such as demineralization or residual disinfectant addition.

In an alternative embodiment of the water/wastewater treatment system according to the present invention, ozone and air could be injected and dissolved within pressurized air saturation tank 72. In this case, pressurization would be in two stages. The first stage would be as previously described, air being injected within the water/wastewater influent and pressurized between 40 and 85 psig (2.8-6.0 kgs/cm$^2$). A second stage would then depressurize the mixture to 10 psig (0.1 kgs/cm$^2$) and inject ozone. The depressurization stage is necessary to minimize the ozone decomposition under pressure. In a further embodiment, ozone injection, instead of air injection, could be used with saturation tank 72. Since the pressure in this case would be 10 psig (0.7 kgs/cm$^2$) instead of the usual 40-85 psig (2.8-6.0 kgs/cm$^2$) a longer retention time is necessary for gas dissolution and, consequently, a larger tank. However, the insertion of ozone under pressure would be most effective if a high concentration of organic solids or microorganisms were in the water/wastewater source.

Obviously, other embodiments and modifications of the present invention will readily come to those of ordinary skill in the art having the benefit of the teachings presented in the foregoing description and the drawings. It is therefore to be understood that this invention is not to be limited thereto and that said modifications and embodiments are intended to be included within the scope of the appended claims.

What is claimed is:

1. A method for removing suspended and colloidal contaminants from raw water and/or wastewater comprising the following sequential steps:
   a. introducing said water/wastewater into the initial stage of a multistage water treatment system;
   b. removing substantially all of the suspended contaminants from said water/wastewater while said water/wastewater passes through said multistage water treatment system;
   c. passing said water/wastewater through foam from a foam supply to remove a portion of the colloidal contaminants;
   d. injecting a gas into said water/wastewater;
   e. pressurizing said water/wastewater for a time sufficient to allow substantially all of said injected gas to dissolve into solution;
   f. depressurizing said water/wastewater to permit the dissolved gas to bubble out of solution, the gas bubbles contacting the remaining suspended and colloidal contaminants to form aggregates which float to the surface of said water/wastewater and collect thereon in the form of a foam; and
   g. separating said foam from the remainder of said water/wastewater, which is thus substantially clarified of pollutants.

2. The method as recited in claim 1 wherein, after the step of separating said foam from the remainder of said water/wastewater, the step of depositing said foam in said foam supply.

3. The method as recited in claim 1 wherein said step of removing suspended contaminants is accomplished through successive stages of coagulation, flocculation and sedimentation.

4. The method as recited in claim 3 further including, before the step of removing suspended contaminants, the step of adding a coagulating agent to said water/wastewater.

5. The method as recited in claim 4 wherein said step of removing suspended contaminants includes a centrifugation stage to remove contaminants with specific weights substantially greater than the specific weight of said water/wastewater.

6. The method as recited in claim 3 further comprising, after the step of depressurizing the solution of water/wastewater and gas, the step of injecting ozone from an ozone supply into said water/wastewater creating a more dense zone of bubbles to oxidize and aggregate with said contaminants substantially all of said water/wastewater remaining above said ozone supply; said ozone aggregates floating to the surface of said water/wastewater and collecting thereon to form a more dense foam.

7. The method as recited in claim 6 wherein said water/wastewater contains sufficient surfactant material that depressurizing the solution of water/wastewater and dissolved air produces a dense zone of fine bubbles.

8. The method as recited in claim 7 further comprising after the step of depressurizing and after substantially all of said aggregates have floated to the surface of said water/wastewater, the step of introducing ozone from an ozone supply into said water/wastewater to disinfect said water/wastewater.

9. The method as recited in claim 8 further comprising, after the step of separating said foam from the remainder of said water/wastewater, the step of depositing said foam in said foam supply.

10. The method as recited in claim 9 wherein the step of passing said water/wastewater through foam from a foam supply, said foam being separated from said water/wastewater, recycles surfactant material back into said water/wastewater.

11. The method as recited in claim 10 wherein in said step of injecting gas into said water/wastewater, said gas is selected from the group consisting of air and ozone.

12. The method as recited in claim 11 wherein in said step of injecting gas into said water/wastewater said gas is a combination of air and ozone.

13. An apparatus for removing contaminants from raw water and/or wastewater comprising:
   a. multistage means for removing suspended contaminants from the water/wastewater;
   b. foam filter means adapted to receive said water/wastewater from said multistage means such that the water/wastewater is passed through a quantity of foam, thereby removing colloidal particles;
   c. a pressure tank adapted to receive said water/wastewater from said foam filter means;

d. injecting means for injecting a gas into said water/wastewater contained in said pressure tank;

e. said pressure tank pressurizing said water/wastewater and said injected gas for a time sufficient to insure that substantially all of the gas is dissolved within the water/wastewater;

f. a flotation tank adapted to receive at one end the solution of water/wastewater and gas from said pressure tank such that the gas is released from the solution in the form of fine bubbles, said bubbles combining with the contaminants present to form aggregates of bubbles and contaminants which float to the surface of the water/wastewater in said flotation tank; said water/wastewater establishing a longitudinal flow in the flotation tank to be drawn out at an opposite end of the flotation tank as treated water substantially clarified of pollutants; and g. separating means for separating said aggregates of bubbles and contaminants from the surface of said water/wastewater.

14. The apparatus as recited in claim 13 wherein said multistage means comprises:

a. a centrifugation tank adapted to initially receive said water/wastewater, the water/wastewater undergoing a centrifugal separation process to remove suspended solids having specific weights significantly greater than the specific weight of the water/wastewater;

b. a coagulation tank adapted to receive said water/wastewater from said centrifugation tank for coagulating suspended contaminants;

c. a flocculation tank adapted to receive said water/wastewater from said coagulation tank for flocculating suspended contaminants; and d. a sedimentation device adapted to receive said water/wastewater from said flocculation tank for settling out suspended contaminants, thereby clarifying said water/wastewater.

15. The apparatus as recited in claim 13 wherein said foam filter means comprises:

a. a supply of foam;

b. a perforated plate; and c. a passageway having an inlet in communication with said multistage means being comprised of said perforated plate and an outlet in communication with said pressure tank, such that said water/wastewater passing from said multistage means to said pressure tank passes through said perforated plate;

d. a quantity of foam from said supply of foam being continuously deposited on said perforated plate such that said water/wastewater entering said pressure tank passes through said foam.

16. The apparatus as recited in claim 15 further comprising:

a. an ozone supply in communication with said flotation tank for injecting ozone into the bottom of said flotation tank providing a dense zone of fine bubbles in said water/wastewater, said bubbles combining with contaminants present in the water/wastewater to form aggregates of bubbles and contaminants;

b. said aggregates resulting from the injection of said ozone in said flotation tank augmenting said aggregates resulting from the dissolution of said gas in said pressure tank, thereby enhancing the clarification of said water/wastewater.

17. The apparatus as recited in claim 16 wherein said ozone supply also injects ozone into said flotation tank at a point in the longitudinal flow of said water/wastewater in said flotation tank where substantially all of said aggregates of bubbles and contaminants have floated to the surface of said water/wastewater; said ozone being injected to disinfect said water/wastewater.

18. The apparatus as recited in claim 17 wherein the gas injected by said injecting means comprises air.

19. The apparatus as recited in claim 18 wherein the gas injected by said injecting means comprises a mixture of air and ozone.

20. The apparatus as recited in claim 19 wherein the gas injected by said injecting means comprises ozone.

* * * * *